July 25, 1972 L. J. BALINT ET AL 3,679,368
CONTINUOUS POLYESTER POLYMERIZATION APPARATUS
Filed Oct. 20, 1969 5 Sheets-Sheet 3

INVENTORS
Laszlo J. Balint
David W. H. Roth
Orvill E. Snider
BY
ATTORNEY

United States Patent Office 3,679,368
Patented July 25, 1972

3,679,368
CONTINUOUS POLYESTER POLYMERIZATION APPARATUS
Laszlo J. Balint and David W. H. Roth, Jr., Chester, and Orvill E. Snider, Petersburg, Va., assignors to Allied Chemical Corporation, New York, N.Y.
Filed Oct. 20, 1969, Ser. No. 867,726
Int. Cl. B01d 1/22; C08f 1/98
U.S. Cl. 23—263      2 Claims

ABSTRACT OF THE DISCLOSURE

Apparatus for continuous esterification and polycondensation comprising a rectification unit having a feed outlet therefrom to a multiple zone, substantial vertical esterification means containing agitators and weirs (wherein said agitators are conical in shape) and interpositioned with respect to said weirs, and devolatilization means located between said multiple zone esterification means and a plug flow means.

BACKGROUND OF THE INVENTION

This invention relates to an improved apparatus and process for the preparation of linear polyesters. More particularly it relates to an improved apparatus and process for preparing high molecular weight and high quality linear polyesters or copolyesters suitable for processing into fibers and films.

Linear polyethylene terephthalate can presently be produced on a commercial scale either by the ester interchange reaction between dimethyl terephthalate and an alkylene glycol or the direct esterification reaction between an alkylene glycol and dicarboxylic acid and then polymerizing the resultant glycol ester under reduced pressure at an elevated temperature. Either the so-called ester interchange process or the direct esterification process wherein linear polyethylene terephthalate is prepared is fraught with many problems, such as, transfer and mixing means, causing long residence time which results in product degradation, the settling and agglomeration of solid delustrants and pigments, additives, such as catalysts, control of the formation of ether groups as well as other undesirable side reactions and equipment size and costs incident thereto. And although considerable improvements have been made in both the processing apparatus and the processes themselves, many problems still exist. Therefore, an improved process and apparatus for the continuous preparation of polyethylene terephthalate, reduced residence time with consequent improved polymer of a quality suitable for conversion into elongated structures such as fibers and films, would make a substantial contribution to this art.

SUMMARY OF THE INVENTION

It is, therefore, a primary object of this invention to provide a new and novel process and apparatus for the continuous preparation of fiber and film forming polyester polymers. Another object of this invention is to provide an improved esterification apparatus in the production of said polymers. Still another object of this invention is to provide an improved polycondensation apparatus for use in the production of said polymers.

Another object of this invention is to provide an improved devolatization apparatus for use in the production of said polymers. Still another object of this invention is to provide an improved surface renewal reactor apparatus for use in the production of said polymers. Another object of this invention is to provide an improved esterification apparatus, an improved polycondensation apparatus, an improved devolatization apparatus and an improved surface renewal reactor apparatus in combination for the continuous preparation of fiber and film forming polyester polymers of improved quality. Still another object of this invention is to provide a more economical process than heretofore by being able to operate the process continuously over an indefinite period of time at reduced cost and at reduced residence time to prepare an improved quality polymer especially suitable for continuous manifold melt conversion to elongated structures, such as, fibers and films. These and other important objects and advantages of the invention will become readily apparent upon a consideration of the following detailed description wherein:

Figure 1:
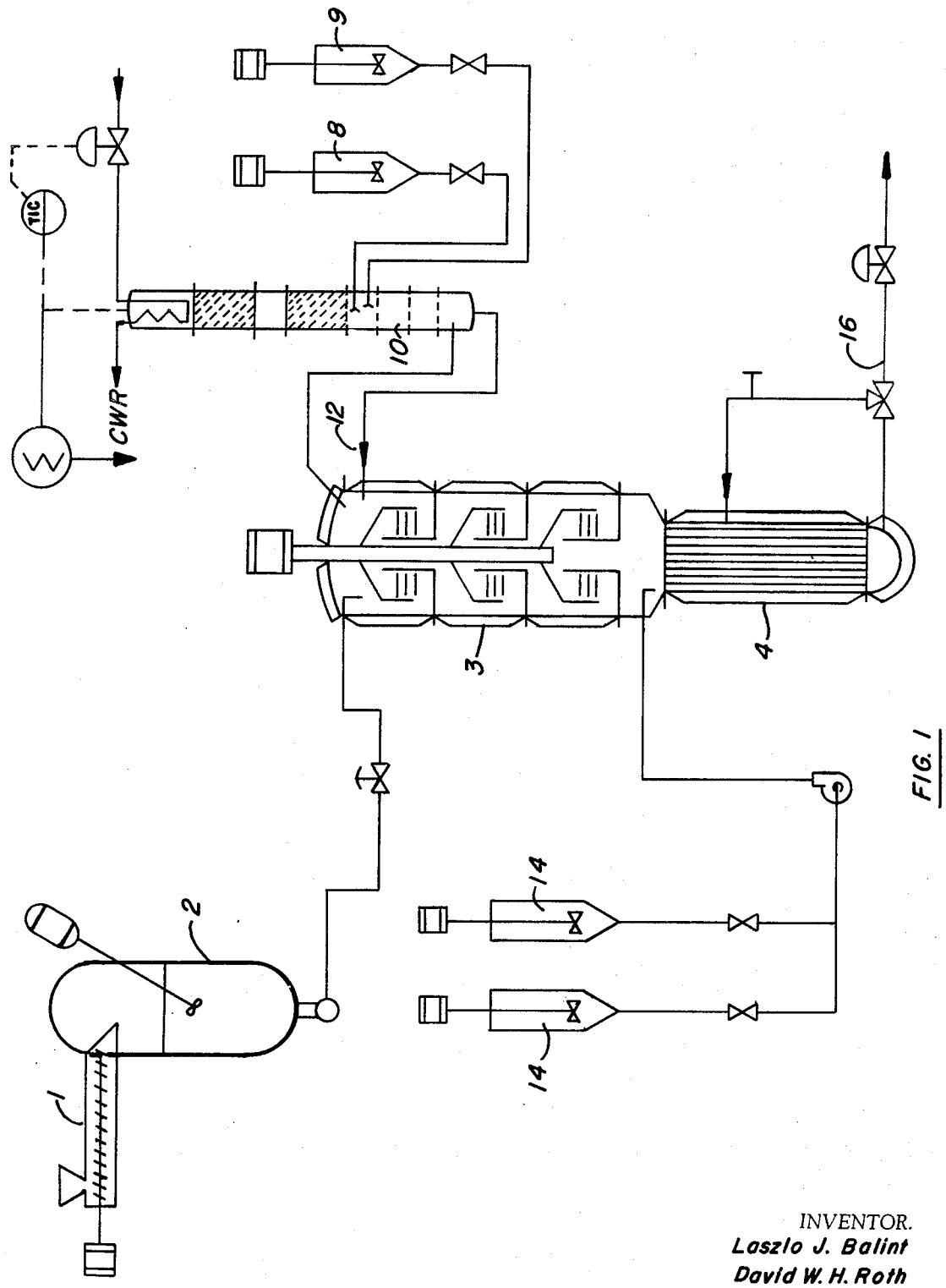
FIG. 1 is a diagrammatic flow sheet which generally illustrates the continuous process of the invention, and in partially schematic form, an improved esterification apparatus 3 shown generaly in FIG. 1, as well as in semi-schematic form, an improved polycondensation apparatus 4 as shown generally in FIG. 1.

Referring now to the drawings, feed supply tank 1 of a lower dialkyl ester or acid is connected with suitable means for conveying said feed to conventional melt container 2. Container 2 is equipped with conventional means for heating and stirring. The ester or acid fed is conveyed by suitable means to multiple zone esterification unit 3. Alkylene glycol feed supply 8 is connected with suitable conveying means 12 to multiple zone esterification unit 3, said conveying means 12 having at least one plate 10 therein. The entrance ports for the ingredients into the overhead zone of the multiple zone esterification unit 3 are located opposite one another.

The multiple zone esterification unit 3, and more specifically the ingredient entrance or overhead zone is in vapor communication with and separated by at least one theoretical plate 10 in FIG. 1 on the upstream side of the introductory port for the alkylene glycol and in vapor communication with and separated by at least two zones on the downstream side.

In operation the alkylene glycol feed serves through utilization of theoreticaly rectification plate 10 to scrub entrained ester or acid that evolves from the reaction in the multiple zone esterification unit 3 thus assisting to accelerate the reaction. The separation of the overhead zone of the multiple zone esterification unit 3 from the precondensation apparatus 4 by at least two zones serves to assist in heating said overhead zone through utilizing the glycol vapors evolving from the precondensation zone thus requiring less external heating to maintain the required process temperature.

The rectification means employed may be conventional plates with bubble caps, sieve plates, ceramic packing, protruded stainless steel packing and the like.

A theoretical rectification plate as described, herein, is a plate on which contact between vapor and liquid is sufficiently efficient so that the vapor leaving the plate has the same composition as the equilibrium with the overflow from the plate.

A bubble cap plate may have an efficiency of 0.6 to 0.85 theoretical plates per actual plate and sieve plates may have an efficiency of 0.75 to 0.90 theoretical plates per actual plate. Ceramic packed columns, protruded stainless-steel packing and other packed type columns normally have a theoretical plate efficiency for a given packing height in the column.

Methods for calibration of distillation units as to their theoretical plate efficiency have been described by C. S. Robinson and E. R. Gillian, "Elements of Fractional Distillation," 4th ed., pp. 119–128, McGraw-Hill Book Company, Inc., New York, N.Y. (1950).

Catalyst and other additive supply means 9 and 14 are utilized as required or desired to control such characteristics of the finished polymer as luster, heat and light stability, dye uptake, adhesion, static dissipation, flammability and the like. Such materials can be added either directly to the multiple zone esterification unit 3 as illustrated by supply means 9 or along with one or the other ingredients or subsequently in the process as illustrated by supply means 14 if more beneficial or desirable to do so.

In a preferred method of operation, the ingredients enter the overhead zone of the multiple zone esterification unit 3 apart from one another wherein the mechanical agitation substantially disperses the ingredients prior to their mixing one with the other. This prevents high concentration contact of the ingredients with the catalyst as well as other additives that may be necessary or desirable, thus eliminating agglomeration and flocculation and therefore assists in maintaining a continuous reaction. The esterification mixture, illustrated in FIG. 1, overflows at the weir in the center of the agitator bell of overhead zone of the multiple zone esterification unit 3, thus coming into surface and cascade contact with the glycol being vaporized in precondensation unit 4. The mixture flowing down the weir walls successively contacts the outside of the bell agitator in the next section of the multiple zone esterification unit 3 and again comes into surface and cascade contact with glycol being vaporized in the precondensation unit 4. This flow sequence is repeated throughout multiple zone esterification unit 3.

Either dialkyl ester or dibasic acid can be used in the process. When acid is used a higher temperature graduation is necessary in the various zones of the multiple zone esterification unit. This temperature difference may vary within the ranges of about 10° C. to about 35° C. Such temperature graduation is critical. When dimethyl terephthalate, for example, is used a temperature of about 190° C. to about 200° C. necessary in the overhead zone of esterification unit 3 with a 15° C.±15° C. temperature differential being maintained in each successive zone including precondensation unit 4. Temperatures varying more than 15° C. for either the esterification or ester-interchange rections within the zones yield significant reaction rate decreases as well as off standard quality of the resultant polyester. For example, if the temperature is allowed to vary more than 15° C. higher than that required, by-products are allowed to form to such a degree that the melting point of the resultant polymer is lowered by 3–5° C. Such reduced melting point reflects an increase in the defect quantities in the resultant fibers prepared from such polymer to such an extent that a standard quality product is essentially unattainable.

Figure 2:
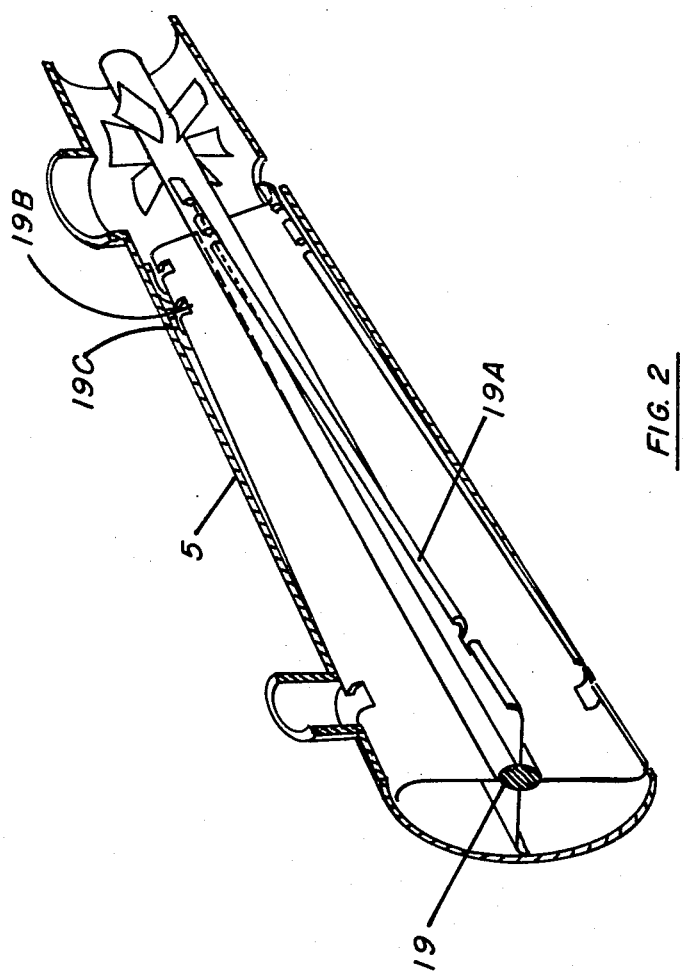
FIG. 2 illustrates in partially-schematic form, an improved devolatization apparatus 5, wherein the prepolymer is further reacted directly following the improved polycondensation apparatus 4.

The precondensate from precondensation unit 4 is then fed to devolatization apparatus 5, specifically illustrated in FIG. 2, through conduit 16, as illustrated in FIG. 1. Recycle of the precondensate from conduit 16 may be made to precondensation unit 4.

The devolatization apparatus 5 decreased in bore from the material inlet to outlet, contains rotor 19 having multiple blades 19A, said blades having a forward helix the angle of which is just large enough to compensate for the initial reverse differential centrifugal effect of the decreasing taper of the barrel and said rotor having axial movement providing an adjustment for an increase or decrease of the clearance between the rotor blades and the reactor wall, thus allowing substantially complete control of polymer film thickness. The blade radius of curvature increased from toward entrance port to exit port and can vary from minimum angle of curvature of 10° to a maximum angle of curvature of 90°. The rotor also can contain straight blades. Therefore, the rotor and blades of devolatization apparatus 5 in relation to the bore are construced in such a manner that high viscosity high molecular weight prepolymer melt is mechanically forced through the reactor. To further increase residence time, rotor blades 19A provide serrations 19B at a point nearer the product outlet. Alternatively or in addition to blade serrations, to increase residence time, each blade diameter near the product outlet is reduced and a series of ring dams or segmented sleeves 19C are provided which moves from the product discharge direction into the reduced diameter zone of the blades to provide for a series of progressively increasing thick film areas followed by a mixed film area with progressively thicker film areas.

As an additional control over the throughput rates and the film thickness within the devolatization apparatus 5, it is preferred that blades be maintained at a tip velocity of between 36 and 1500 ft./min. at the point of initial polymer contact with the blades, and more preferably at a peripheral tip velocity of 45 to 900 ft./min.

These values are applicable for thin-film devolatization units between 1 foot and 8 feet in diameter.

At higher peripheral tip velocities for the thin-film reactor rotor blades, too much mechanical heat is injected and temperature is controlled with difficulty. At a lower peripheral speed, there is insufficient volatile stripping and molecular weight increase. At lower viscosity levels (.1 to .2 intrinsic), the preferred tip velocity range is between 500 and 1000 ft./min. and a tip velocity of 45 to 500 ft./min. is preferred at an intrinsic viscosity of .4 to .6.

The speed of rotation of the rotor blade and the film thickness selected are such that there is at least 100 square feet of polymer surface exposed per pound of polymer throughput and between 100 and 500 square feet of polymer surface per pound of polymer throughput.

In a more preferred form, there will be 300±50 square feet polymer surface area exposed per pound of polymer throughput.

A centrifugal foam and entrainment separator is located near product outlet end of devolatization apparatus 5. Product outlet is provided with conventional screw means for discharge of the polymer. Other equivalent means, such as a pump can be used in lieu of a screw means for positive discharge of the prepolymer material from devolatization apparatus 5.

In operation, precondensate material from unit 4 undergoes further reaction quickly and efficiently in devolatization apparatus 5 by being mechanically controlled as a thin film having a thickness not in excess of 0.20 inch, said thickness being continuously renewed while maintaining said renewed surfaces for a period of time from about 4 seconds to about 5 minutes at a temperature from about 270° C. to about 350° C. and at a pressure not in excess of 70 mm. Hg. Foaming, which is typical of high polymer condensate when exposed to reduced pressure and which is further complicated by its natural tendency to move in the direction of low pressure areas because of high interfacial tensions between the high molecular weight material and the metal with which it is in contact and the surface tension forces and the intermolecular forces within the polymeric film is significantly reduced in a zone of high mechanical agitation where vapors disengage from renewed thin film surfaces including any foam generated therefrom where the forced mechanical release of vapor continues to be applied throughout the surface of the thin film reactor. Vapor is present within the devolatization apparatus reactor until the foam approaches the centrifugal foam and entrainment separator 19E wherein a low velocity space is provided, generally 180° from the product outlet, where the vapor is removed and the centrifugal foam and entrainment separator 19E moves any liquids present away from the vapor outlet and back toward the product outlet. The mechanical design and the axial adjustment of the rotor within the devolatization apparatus reactor 5 allows for substantially complete control of the very rapid increases in molecular weight and melt viscosity of the polymeric condensate. The tapered rotor blades decrease in diameter in the direction of the product outlet to reduce the peripheral velocity of the blades in proportion to the increase in melt viscosity of the polymer being produced. Additionally, with a decrease in diameter of the bore of the reactor from the product inlet to the product outlet, the rotor axial movement provides an additional adjustment as necessary or desirable for the increase or decrease of the clearance between the rotor blades and the reactor cone apex thus allowing control of polymer film thickness. Thus, this clearance can be adjusted for wear of the rotor blades as well as the reactor wall surface and provides for an efficient method of changing viscosity levels by adjusting film thickness in proportion to the viscosity level and the heat transfer needs of the viscous media being produced, for example, a decrease in film thickness at low viscosity levels and lower throughput rates can compromise with an increase in film thickness at high throughput rates and high viscosity levels.

Film thickness should be maintained between 0.01 to 0.20 inch in thickness for a distance of at least 60% of its travel through the devolatization reactor. More preferably, it will be maintained between .020 and 0.1 inch over at least 50% of its passage through the thin-film reactor.

Figure 3:
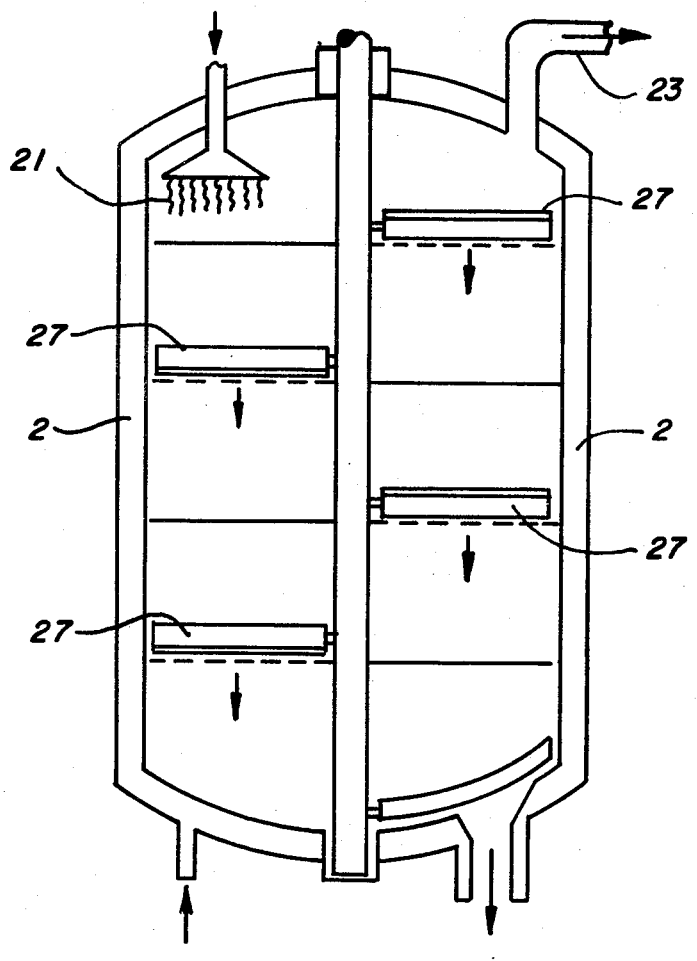
FIG. 3 illustrates in semi-schematic form, an improved surface renewal reactor apparatus 6 wherein the prepolymer is further reacted directly following the improved devolatization apparatus 5.

Increased residence time is further obtained by providing for serrations in the rotor blades at a point nearer the product outlet as well as a series of ring dams or segmented sleeves similarly located as shown in FIG. 3. Such blades serrations and or ring dams or segmented sleeves can increase the propolymer residence time of the total film area by a factor of 5 to 10 fold. The molten prepolymer is removed from the thin-film condensation reactor by a positive screw or pump means so as to assist in controlling residence time and to positively extrude the prepolymer either into by-product vaporizing means 5 or into a surface finish reactor unit 6.

The surface renewal reactor apparatus comprises a vessel with generally cylindrical interior having its long axis substantially vertical and wherein its dimensions provide sufficient space to allow the extrudate either in the form of continuous or non-continuous strands or film upon their entrance thereinto to be subjected to a devolatization vaporizing environment for such time wherein a substantial amount of vaporizable by-products are removed. The temperature of vessel is maintained by conventional temperature control means and has an inlet and outlet aperture at opposite ends thereof with the inlet aperture being located at the top thereof. An extrusion apparatus 21 is located within said inlet aperture and so positioned wherein material entering said vessel passes therethrough. Vacuum conduit 23 from vacuum means not shown for creating the devolatization environment can be positioned in the vessel wall, preferably being located at or near the top thereof. "Separator" means (not shown) can be utilized between the vacuum means (not shown) and said extrusion apparatus 21. Surface renewable plates 27 are positioned commencing six to eight feet below extrusion apparatus 21. The product is removed by pumping through conventional positive displacement pumps or screws to subsequent operations.

In operation, the molten prepolymer is pumped from devolatization apparatus reactor 5 through extrusion means 21 located within the inlet aperture of surface renewal reactor means 6 wherein extruding means 21 imparts a predetermined surface area to the molten prepolymer of at least about 0.2 square feet of prepolymer per pound thereof by extruding said prepolymer in the form of continuous or non-continuous strands or film and subjecting said strands or film to a devolatization environment at elevated temperature and sub-atmospheric pressure to remove a substantial amount of vaporizable by-products. The devolatization environment comprises conditions of about 270° C. to about 350° C. temperature and not more than about 500 mm. Hg pressure and with a residence time between about 5 and 60 minutes. Following this operation the condensed polyester is pumped to subsequent operations.

The design of the surface renewal reactor and rate of polymer surface exposure is such that in the plate section $$150 \begin{Bmatrix} +100 \\ -50 \end{Bmatrix} \text{square}$$

of polymer surface is exposed per pound of polymer throughput. Preferably 175±50 square feet of polymer surface is renewed per pound of polymer throughput. The surface thickness of film being exposed in the surface renewal reactor is 0.65±.5 inch.

A range of polyesters can be prepared in the reactor trains described herein. They are especially suitable for the production of polyesters by means of ester interchange between ethylene glycol and dimethyl terephthalate to form polyethylene terephthalate and with other glycols such as trimethylene glycol, tetramethylene glycol to form, respectively, polytrimethylene terephthalate and polytetramethylene terephthalate. Likewise, these same glycols can be reacted with terephthalic acid in an esterification reaction to form the same polyesters.

Other thermoplastic fiber-forming polyesters can be efficiently polymerized where the above glycols are reacted with:

4,4′ bibenzoate

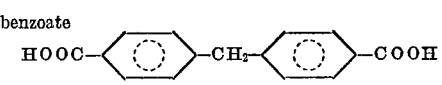

4,4′ methylene bibenzoate

The reaction train is also efficient in the production of poly(1,4 cyclohexylene terephthalate) by transesterification of 1,4 cyclohexane dimethanol with dimethyl terephthalate or by esterification of terephthalic acid. The improved devolatization apparatus 5 and the surface renewal condensation reactor 6 are also effective and highly efficient condensation reactors for polyamides, such as, nylon 6, nylon 6, 6, nylon 12, poly-4,4′ methylene dicyclohexylene dodecanediamide, poly-4,4′ methylene dicyclohexylene azelamide, poly-4,4′ methylene dicyclohexylene decanediamide, poly-4,4′ methylene dicyclohexylene hexadecanediamide. Typically, the dicyclohexylene polyamides have greater than a 60% trans, trans structure.

Other polyamides which are efficiently post condensed in this reactor train are those which have the general structural formula:

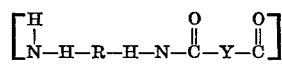

where R is selected from the group consisting of:

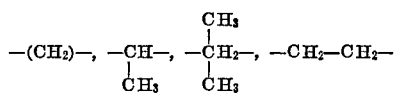

and Y is methylene chain of 6 to 18 carbons and the dicyclohexylene moiety is at least 60% of the trans isomer.

The reactor train of the devolatization apparatus 5 and the surface renewal reactor 6 are effective in condensation reactions of polyureas, especially those having melting points of 220–310° C., among which are:

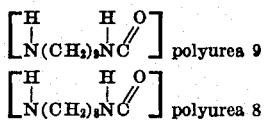

and

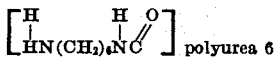

Various additives may be added to aromatic dicarboxylic acid-alkylene glycol feed or during subsequent reactions in order to further control the reactions or physical characteristics of the final polymer as required for specific end uses. For example, if fatigue resistance is desirable, a small amount of dipheneylene phenylene diamine can be added. Other well known additives can be used to control such characteristics as heat and light stability, dye uptake, adhesion, static dissipation, luster, flammability and the like. Other frequently used additives are dyestuff precursors and assistants, non-reactive and heterogeneous polymers, pigments, fluorescent agents, brighteners and the like. Reaction control agents such as esterification or polycondensation catalysts, ether inhibitors, chain terminators, etc., can also be added with the dicarboxylic acid-akylene glycol feed or during esterinterchange or the direct esterification.

In the reactions of polyesters, conventional stainless-steel reactors show sufficient corrosion rates to cause a small but distinguishable discoloration of the synthetic fibers. Thus, it is preferred that "stabilized" stainless steel be employed of Type 316 or 317 which have been stabilized with 2–4% molybdenum and contain 10–18% nickel and 16–20% chromium. These materials of construction show 25% to 75% the corrosion weight loss of conventional 18% chromium, 8% nickel stainless steel and other corrosion resistant alloys such as Inconels and Hastalloys and are thus preferable for use in preparing polyesters.

The terminology degree of polymerization as employed herein is defined as the *degree of polymerization* equals the weight average molecular weight divided by the molecular weight of the monomeric unit in the chain. The number average molecular weight is determined by dividing $2 \times 10^6$ by the total ends (COOH+OH). The degree of polymerization then is ascertained by dividing the molecular weight of the monomeric unit into the number average molecular weight. To illustrate: a polyester made by either dimethyl terephthalate an dethylene glycol or terephthalic acid and ethylene glycol has a monomeric molecular weight in the polymer chain

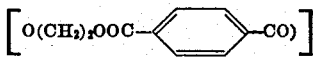

of 192.16. Thus, the polymer unit having a number average molecular weight ($\overline{M}n$) of 19,216 would have a degree of polymerization of 19,216/192.16=100, or a polymer of a degree of polymerization of 100 would have a number average molecular weight ($\overline{M}n$) of 100×192.16, or 19,216.

The following examples serve to illustrate the new and novel apparatus and process of the present invention and the advantages thereof but are not to be interpreted as limiting the invention to all details of the examples.

EXAMPLE 1

(Control)

Ethylene glycol (1,240 parts) and dimethyl terephthalate (1,552), 2.5:1 molar ratio, are heated in a reaction vessel fitted with a reflux condenser using as a catalyst 0.015% of zinc acetate and 0.02% of antimony oxide. Ester-interchange takes place at atmospheric pressure and at a temperature in the range of 147–208° C. and is complete when 512 parts of methanol has been collected after 4 hours and 35 minutes. The reaction mass is then transferred to an autoclave fitted with a constant speed agitator. The temperature is brought to 275° C. and the pressure reduced to less than 1 mm. Hg. Polycondensation proceeds with elimination of glycol until the required molecular weight is attained. Polycondensation is followed by measuring the increase in power input required by the agitator. The total time for polycondensation to take place is 7 hours and 28 minutes. The reaction is stopped when a limit is attained known to correspond with an intrinsic viscosity of 0.6–0.7. The intrinsic viscosity obtained is .61 and the softening point is 260.6° C.

EXAMPLE 2

Ethylene glycol and dimethyl terephthalate, 1.25:1 molar ratio, are fed into multiple zone esterification-precondensation unit 3 which contains some bis($\beta$-hydroxyethyl) terephthalate. The temperature of unit 3 is maintained at 195° C. and becoming progressively higher in units 3A and 3B as illustrated in Table I. A delustrant of dispersed titanium dioxide of 0.2–0.3 weight percent of finished polymer is added. Zinc acetate in an amount of 0.6 pound/hour is slurried with the ethylene glycol feed and fed to the system along with the ethylene glycol feed. An oxide of phosphorus is added to assist in white color maintenance. The glycol containing the zinc acetate catalyst is maintained at 155° C. The mixture of zinc and ethylene glycol along with the glycol-titanium dioxide slurry is added into unit 9 or the alcohol or glycol recovery column and then passes over rectification plates 10 and 11 prior to entry into the multiple zone esterification-precondensation unit 3. Vapors moving upward from unit 3 which contain some dimethyl terephthalate are scrubbed by the downward flow of the ethylene glycol. Some ester interchange occurs to form bis($\beta$-hydroxyethyl) terephthalate and serves to accelerate the esterification reaction in esterification-precondensation unit 3. The ingredients are added continuously and overflows weir in unit 3, passes down over the bell and into the weir of unit 3A, and likewise over unit 3B and down into the precondensation zone 6 of the multiple zone esterification-precondensation unit 3. Antimony trioxide or other antimony compounds are fed at the rate of 0.6 pound per hour into the process just prior to the precondensation zone 6. Precondensation zone 6 is maintained at a temperature in the range of 230–270 C. Ethylene glycol and bis($\beta$-hydroxyethylene) terephthalate are recirculated over the precondensation heating surfaces until a degree of polymerization of 2–6 is obtained, for a total residence time of about 30 to 70 minutes. The precondensation material then passes into devolatization apparatus 5 where a pressure of 25 mm. of pressure is maintained with a residence time of 2 minutes. The conditions of the reaction are as illustrated in Example 2 of Table II. The prepolymer from devolatization apparatus 5 is then pumped through a 700 aperture die plate, each aperture having a diameter of 0.12 inch. As the molten polymer is extruded in the form of continuous or non-continuous strands or film into surface renewal reactor 6, it drops for a distance of 6–8 feet and is subjected to a vaporizing environment at a predetermined surface area of the molten prepolymer of at least 0.2 square feet of prepolymer per pound thereof. The evaporative environment is maintained at a temperature in the range of between 270° C. and 280° C., a pressure in the range of 3–70 mm. Hg and with a residence time of 5–60 seconds. The molten polymer extrudate drops onto successive heated surface renewal finisher plates 27 within surface renewal reactor 6 and is subjected to a scraping and spreading action of one or more mechanically moved blades 31 that progressively forces the extrudate through surface renewal reactor 6. The temperature of plates 27 is maintained in the range of 270° C. to 300° C. The polymer is discharged from surface renewal reactor 6 by a polymer discharge pump and is forced through a melt viscometer of falling piston type where the melt viscosity is maintained at an equivalent ortho-chlorophenol viscosity of 72 which equals a polymerization degree of 100. This is a melt viscosity of 2,750 poises as measured at 275° C. and a shear rate below 500 reciprocal seconds.

EXAMPLES 3–6

These examples prepared in accordance with the process of Example 2 illustrate the various ingredients used and the effect of deviation from the preferred temperature in the production of polyethylene terephthalate in the multiple zone esterification-precondensation unit 3 as shown in Table I.

apparatus 3. Precondensation apparatus 4 is maintained at a temperature of 260° C. The reaction conditions in the remaining reactor units are maintained as described in Example 2. The finished polyester polymer has a degree of polymerization of 100, an ortho-chlorophenol viscosity of .72, a melt viscosity of 2,750 poises and when subsequently processed produces a very white product with exceptional few operational defects.

EXAMPLE 9

Dimethyl terephthalate at the rate of 3900 pounds per hour and 1,4-cyclohexane dimethanol (containing 70% trans-isomer) and having slurried 0.2 weight percent of titanium dioxide at the rate of 5800 pounds per hour

TABLE I

| Feed material | Precondensation temperature, °C. | Degree of polymerization | Polymer melting point DTA, °C.[1] | Reaction rate, percent of base | Spinning and drawing performance |
|---|---|---|---|---|---|
| A... DMT plus EG | 240 | 2.0 | 268 | [2] 100 | Good. |
| B......do | 255 | 2.2 | 260 | 120 | Poor. |
| C......do | 225 | 1.85 | 265 | 75 | Good. |
| D... TPA plus EG | 250 | 2.5 | 265 | 100 | Very good. |
| E......do | 270 | 5.0 | 258 | 150 | Poor. |
| F... DMT plus cyclohexane dimethanol | 250 | 4.0 | 298 | | Excellent. |

[1] After passing through surface finisher reactor 6.
[2] Base.

Table II illustrates the effects of residence times and temperature upon the quality of the polymers obtained from devolation apparatus 5.

are fed into multiple zone esterification apparatus 3 as in Example 8. Manganese acetate, 1.5 pounds per hour is slurried with the 1,4-cyclohexane dimethanol and fed

TABLE II

| Description variable | Example 1 [1] | Example 2 | Example 3 | Example 4 | Example 5 | Example 6 |
|---|---|---|---|---|---|---|
| | Reactor type | | | | | |
| | Conventional reactor agitated vessel | Devolatization thin-film reactor | Devolatization thin-film reactor | Devolatization thin-film reactor | Devolatization thin-film reactor | Devolatization thin-film reactor |
| Temperature devolatization apparatus reactor 5, °C | 275 | 280 | 280 | 360 | 280 | 320. |
| Pressure, mm. Hg at head of devolatization apparatus reactor 5. | 1–6 | 5 | 4 | 80 | 5 | 4. |
| Polymer residence time in devolatization apparatus reactor, in minutes. | 180 | 3 | .3 | 10 | 2 | 4. |
| Polymer film thicknesses, in inches | Does not apply | 0.01 | 0.04 | 0.25 | 0.03 | 0.05. |
| Comparative reaction rates, percent | 1 | 100 | 1,000 | 80 | 150 | 110. |
| Melting point of polymer after finisher, °C | 260 | 268 | 270 | 258 | 268 | 298. |
| Product color | Off-white | White | Very white | Grey | White | Very white. |
| Spinning quality | Fair | Good | Excellent | Poor | Good | Good. |

[1] Control.

NOTE.—In Table II can be seen the effect of residence times and temperatures upon the quality of the polymers obtained from devolatization apparatus reactor 5.

EXAMPLE 7

The high molecular weight polyalkylene terephthalate of this process was prepared as in Example 2 except that 10,300 pounds per hour dimethyl terephthalate was charged to produce 100,000 pounds per hour of polyalkylene terephthalate polymer. The reaction time in the devolatization apparatus reactor 5 was maintained at 1 minute, the temperature at 280° C., the pressure at 5 mm. Hg with a degree of polymerization of 80 being obtained. The prepolymer film thickness was maintained at .04 in devolatization apparatus reactor 5. The finished polyester polymer from surface renewal reactor 6 has a degree of polymerization of 100, an ortho-chlorophenol viscosity of .72, a melt viscosity of 2,500 poises and when subsequently processed produces a very white product.

EXAMPLE 8

Terephthalic acid at the rate of 2000 pounds per hour is fed into one side of uppermost zone of multiple zone esterification unit 3 while ethylene glycol containing a weight percent of titanium dioxide sufficient to yield 0.2 weight percent in the finished polymer is fed into an opposite side from the acid of uppermost zone of the multiple zone esterification apparatus 3 at 1.4 moles of ethylene glycol per mole of terephthalic acid. Multiple zone esterification apparatus 3 is maintained at a temperature of 195° C. Antimony trioxide, 0.02 weight percent based on the weight of acid is added to the esterification therewith to unit 3 Esterification is carried out as in Example 2. Antimony trioxide at the rate of 2 pounds per hour is metered as ethylene glycol slurry to the top of precondensation unit 6. The temperature in unit 6 is maintained at 250° C. The prepolymer having a degree of polymerization of 4 is passed through devolatization apparatus reactor unit 5 with a residence time of 4 minutes, a film thickness of 0.05 inch and the temperature is maintained at 320° C. The degree of polymerization is 65 upon exit from devolatization apparatus reactor unit 5. The polymer is then passed through surface renewal reactor 6 where the temperature is maintained at 320° C., residence time is maintained at 4 minutes and the vapor pressure is maintained at .2 mm. Hg. The finished polyester polymer has a degree of polymerization of 90, a melt viscosity of 2500 poises as measured at 305° C., a density of 1.22 grams per cubic cm., and a melting point of 298° C. The polymer is exceptionally white and gives exceptional uniform performance upon subsequent processing.

From the foregoing discussion, description, drawings and data, it is easily observed that the present invention provides a significant contribution in the art of preparing high molecular weight aryl polyesters and copolyesters suitable for use in the preparation of fibers and film. While the invention has been described with regard to specific detail, it will be appreciated that changes can be made without departing from its scope.

Figure 5:
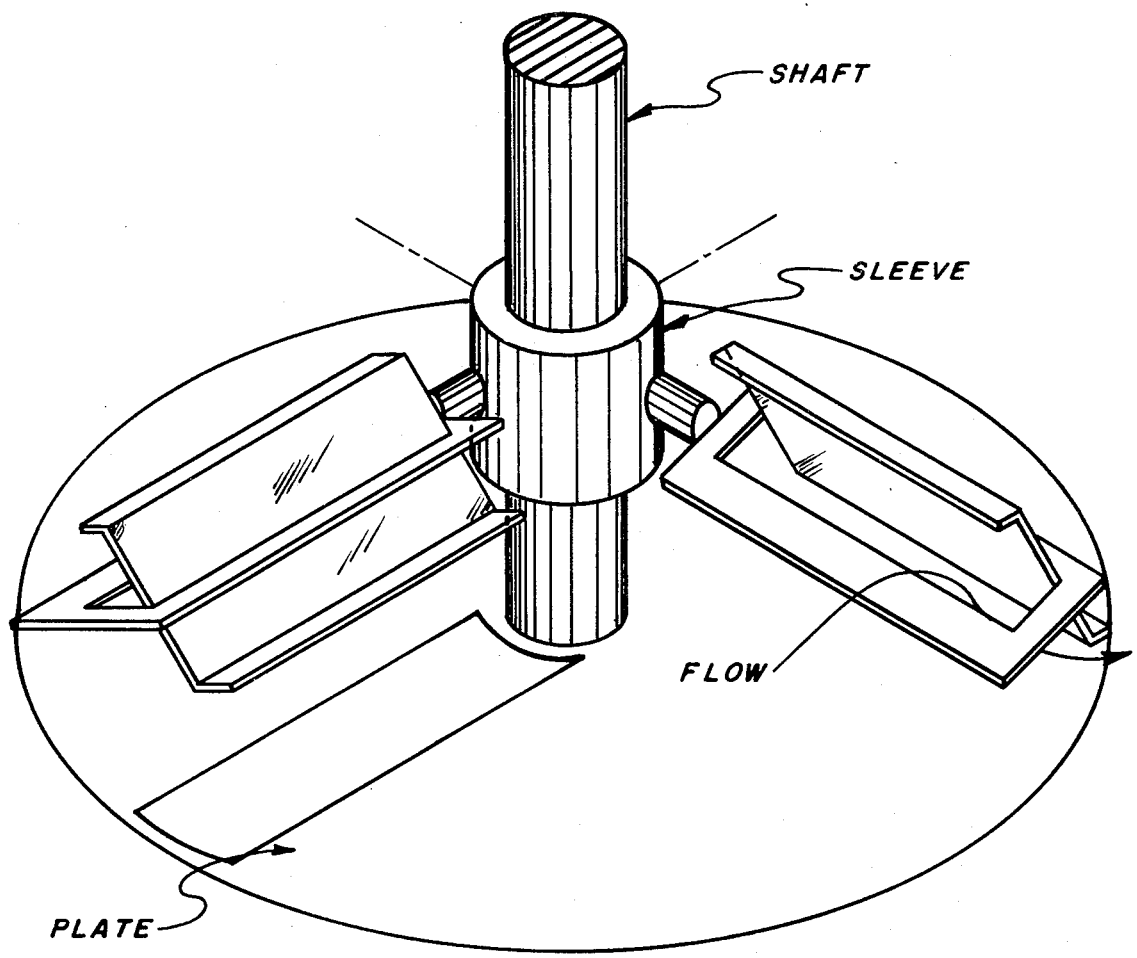
FIG. 5 is a semi-schematic section illustrating the movable blade and its scraper and spreader arrangement thereon in relation to the plate and the flow of material therethrough of FIG. 3, wherein the material is again subjected to a thin film spreading action.
Figure 6:
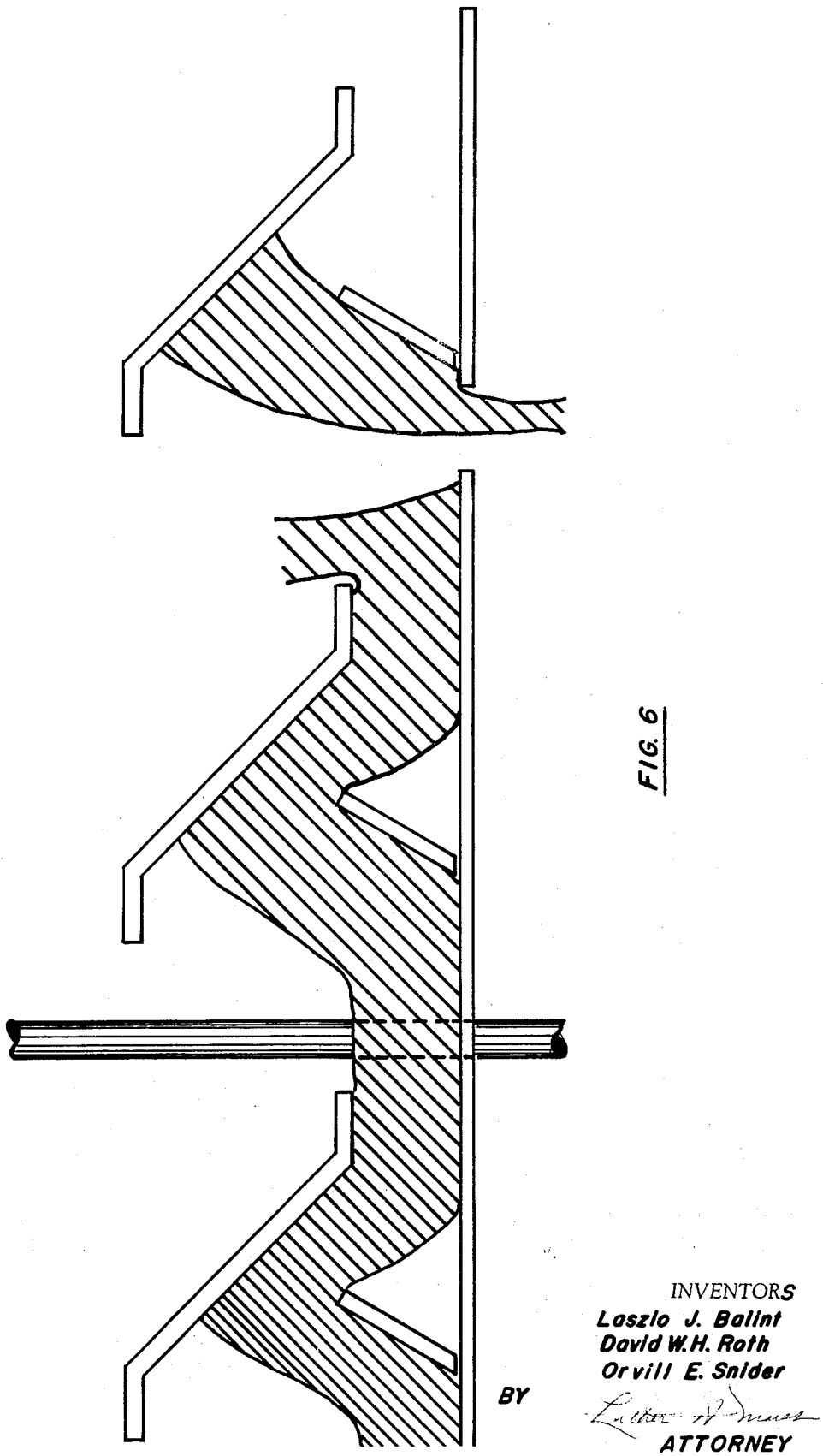
FIG. 6 illustrates in more detail and in partially-schematic form, the scraper and spreader type arrangement of a typical blade positioned adjacent the plate as shown in FIG. 5.

We claim:
1. Apparatus for the continuous esterification and polycondensation of an alicyclic diester, aromatic diester, or a dibasic acid with a polyol containing 2 to about 10 carbon atoms per molecule under ester interchange or direct esterification conditions comprising:
(a) a multiple zone reaction system with generally cylindrical interior having its long axis substantially vertical and having thermal means for controlling the temperature of said system,
(b) inlet means and outlet means for reaction material located at opposite ends of said system, said inlet means being located at the top of said system and wherein the diester is used the inlet means is located at a point other than where the polyol inlet means is located,
(c) communication means located in top and bottom of said system,
(d) rectification means located between said inlet means of said multiple zone reaction system and a multiple zone esterification means for scrubbing entrained esters or acid that evolves from the reaction in said multiple zone esterification means,
(e) multiple zone esterification means located between said rectification means and a precondensation means for intricate and intimate mixing of said ingredients including multiple level weirs positioned therein,
(f) agitating means located within said multiple zone esterification means, said agitating means being conical in shape and interpositioned with respect to said weir means, whereby intimate mixing of said ingredients is continuously maintained by surface and cascade contact wtih vaporized polyol from said precondensation means, and
(g) devolatilization means, located between said multiple zone esterification means and a plug flow means, for filming of said reacting material to from about 0.005 inch and to about 0.200 inch, said devolatilization means comprising an elongated reaction vessel having an inlet and outlet means located at opposite ends of said vessel, said inlet means being in communication with said precondensation means for continuously supplying precondensate to said elongated reaction vessel, said vessel having an internal tapered bore from said inlet means to said outlet means, said outlet means being located at minimum bore and having a vapor outlet means and a product outlet means, said vapor outlet means being separated from said product outlet means by at least ninety degrees, said elongated reaction vessel having an agitating means comprising a rotatable shaft having blades attached, said blades having a clearance between said vessel walls of from between about 0.01 to about 0.2 inch, at least half of said blades having a helix angle at least one degree greater than the taper angle of said vessel bore, said blades having serrations near said product outlet means, and at least one blade located within the vapor zone of said vessel and pitched at an angle opposite to that of the vessel bore and at an angle of at least ten degrees greater than the taper angle of the bore (as substantially shown in FIG. 5) and said elongated reaction vessel having an adjustable shaft means for adjusting the thickness of said reaction material by moving said shaft either toward said inlet means or toward said product outlet means.

Figure 4:
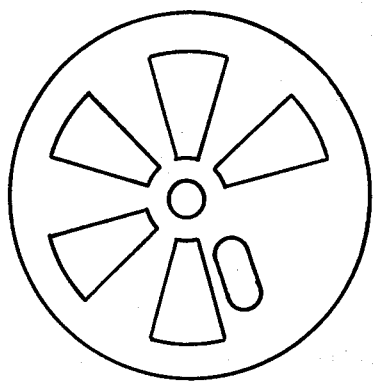
FIG. 4 illustrates a typical traverse section of the surface renewal reactor specifically showing the distribution of drainsectors on the plates taken on line 2—2 of FIG. 3.

2. The apparatus of claim 1 wherein the (g) devolatilization means comprises a vessel with a generally cylindrical interior having its long axis substantially vertical, thermal means for controlling the temperature of said vessel, inlet and outlet means for the reaction mixture located at opposite ends thereof, said inlet means being located at the top of said vessel and having a reaction mixture entrance means within said inlet means, a vacuum means located oppositely said inlet means for pressure control, an entrainment separator means located between said reaction mixture entrance means and said vacuum means for maintaining said reaction mixture within said reactor, a mixing means within said vessel comprising a series of plates having an exit port (as shown in FIG. 4), said exit port being located opposite of each exit port of the preceding plate and the following plate within said vessel, each plate being connected to an arm extending from a central shaft and having rotatable blades juxtaposed with relation to each other, first said plate being in an uninhibited area at such distance from the reaction mixture extrusion entrance means to allow removal of volatile products prior to mixing, said plates being located substantially ninety degrees to the plane of the reactor wall, said blades functioning for successively lifting, lowering, and spreading the reaction mixture upon and through said exit port of said plate, and a plug flow chamber located within said reactor from said outlet means to a point within said vessel wherein said plug flow is retained for a sufficient period of time.

References Cited

UNITED STATES PATENTS

| 3,241,926 | 3/1966 | Parker et al. | 23—283 |
| 2,717,202 | 9/1955 | Bailey | 23—283 |
| 3,486,865 | 12/1969 | Furusawa et al. | 23—285 |
| 2,927,634 | 3/1960 | Gudheim | 159—6 |
| 3,031,273 | 4/1962 | Latinen | 23—285 |
| 2,156,236 | 4/1939 | Bonotto | 23—270 X |
| 2,146,532 | 2/1939 | Crane et al. | 159—2 E UX |
| 3,466,150 | 9/1969 | Dietze et al. | 23—285 |

JAMES H. TAYMAN, JR., Primary Examiner

U.S. Cl. X.R.

23—285, 283; 159—2 E, 6 W; 260—75 M